United States Patent [19]
Smith

[11] 3,903,986
[45] Sept. 9, 1975

[54] STEERING COLUMN LOCK
[75] Inventor: Arthur H. Smith, Maplewood, N.J.
[73] Assignee: Wagner Electric Corporation, Parsippany, N.J.
[22] Filed: Feb. 13, 1974
[21] Appl. No.: 441,954

[52] U.S. Cl............. 180/114; 70/255; 123/198 B; 200/44; 307/10 AT; 340/52 D; 340/64; 70/252
[51] Int. Cl.²........................................ B60R 25/04
[58] Field of Search...... 180/114; 70/252, 255, 265; 123/198 B; 340/52 D, 64; 307/10 AT; 200/44

[56] References Cited
UNITED STATES PATENTS

| 1,753,347 | 4/1930 | Meuer | 70/252 |
| 2,726,535 | 12/1955 | Craig | 70/265 |
| 2,726,537 | 12/1955 | Craig | 70/265 |
| 3,490,255 | 1/1970 | Wight et al. | 70/252 |
| 3,543,040 | 11/1970 | Nemeth | 180/114 |
| 3,560,673 | 2/1971 | Schweizer | 200/44 |
| 3,646,515 | 2/1972 | Vodehnal | 180/114 |
| 3,654,600 | 4/1972 | Yamamoto | 340/52 D |
| 3,688,861 | 9/1972 | Lipschultz | 180/114 |
| 3,798,398 | 3/1974 | Hills | 200/44 |

*Primary Examiner*—David Schonberg
*Assistant Examiner*—John P. Silverstrim
*Attorney, Agent, or Firm*—Eyre, Mann & Lucas

[57] ABSTRACT

An improved steering column lock is disclosed. The actuator bar normally associated with steering column locks is obstructed from forward movement by a solenoid operated locking member thereby helping to prevent unauthorized use of a motor vehicle.

5 Claims, 3 Drawing Figures

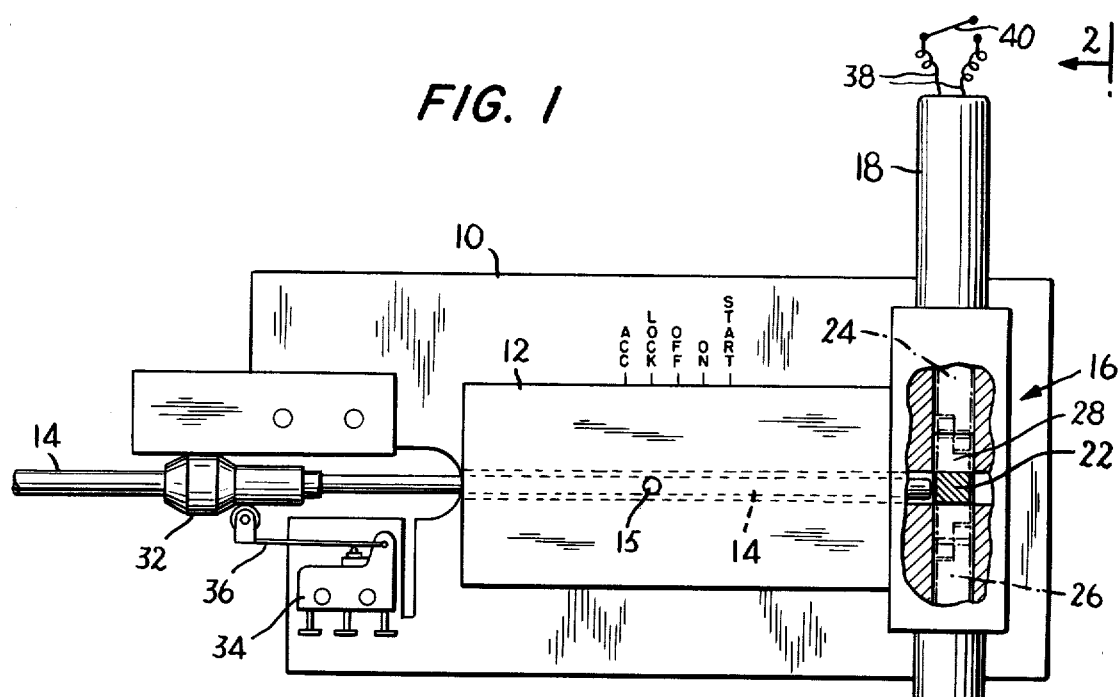
FIG. 1
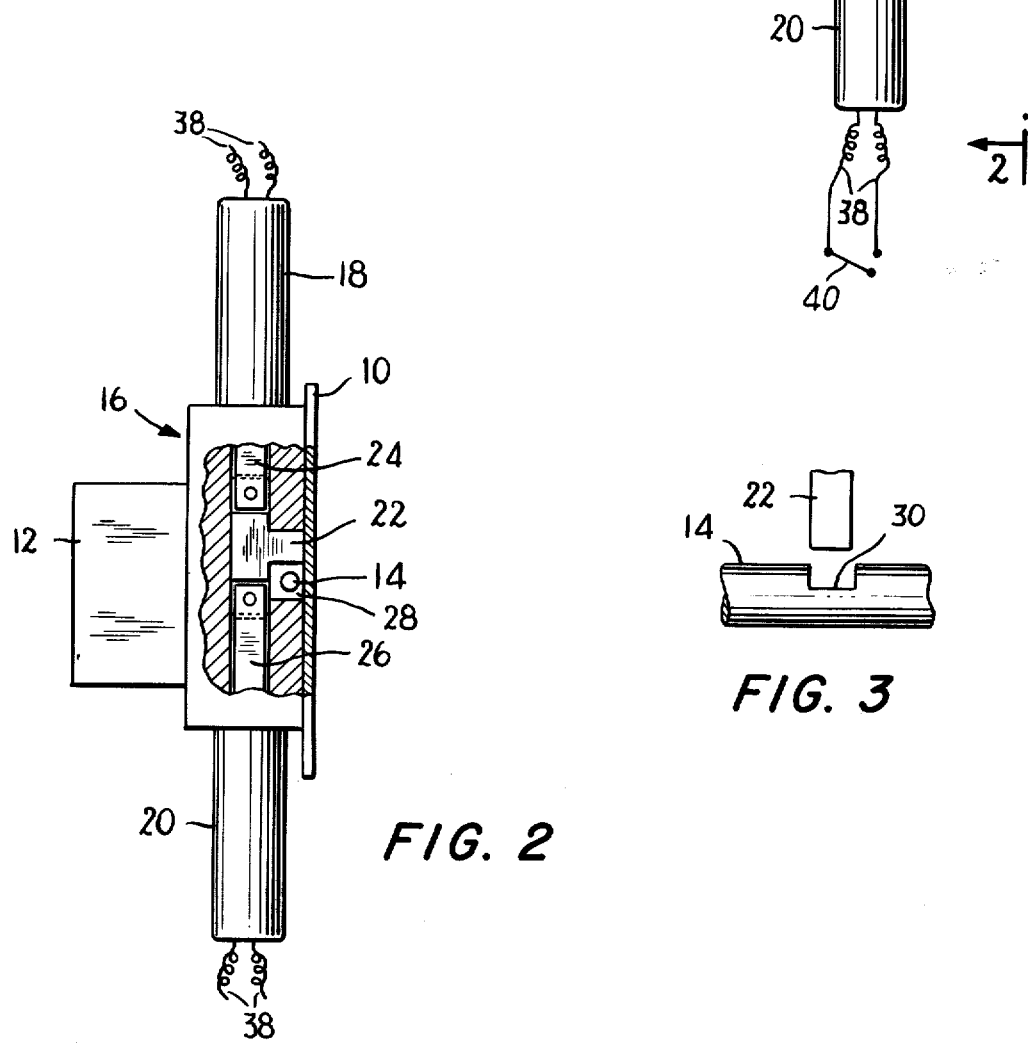
FIG. 2
FIG. 3

STEERING COLUMN LOCK

The present invention relates to an improved motor vehicle steering column lock mechanism.

Motor vehicle steering column locks are quite well-known in the art. They comprise a keyed ignition lock which, when rotated, advances an actuator rod to cause actuation of the ignition switch and releases the steering wheel and gear shift lever. These locks have been of considerable benefit in reducing automobile thefts. However, it is still a very common occurrence for an automobile thief to have or make a key which will fit the ignition lock and thwart the advantage of the steering column lock system.

In accordance with the present invention, an additional security system is added whereby the steering column lock is rendered inoperative by electrical means independent of the ignition lock and it cannot be circumvented even if one has the ignition key. The ignition switch actuator bar, normally longitudinally moveable by rotating the ignition lock, is prevented from moving in a forward position by means of a solenoid operated locking member. The locking member can be moved only by means of a solenoid which is operated independently of the ignition lock. In the preferred embodiment, the actuator bar is only prevented from moving forward but it can also be prevented from moving backward if it is desired to also prevent the use of the "accessory" position of the ignition switch.

These and other features of the present invention may be more fully understood with reference to the drawings in which:

FIG. 1 shows a suitable embodiment of the present invention;

FIG. 2 shows a side cut-away view of the preferred embodiment of the improvement along the line 2—2 of FIG. 1; and FIG. 3 shows an alternate embodiment of that shown in FIG. 2.

FIG. 1 shows a mounting bracket 10 with an ignition switch 12 affixed thereto. The ignition switch will generally have five positions: "accessory," "lock," "off," "on," and "start" as shown. An actuator bar 14 passes through the switch and completes the circuit to the selected position by means of an actuating member 15. The actuator rod 14 is advanced from a keyed ignition lock to the left of the drawing in known manner (not shown).

In accordance with the present invention, an auxiliary locking mechanism shown generally at 16 is employed to control movement of the actuator rod 14. The preferred embodiment of the auxiliary locking mechanism 16 is shown in side view and break-away detail in FIG. 2. The mechanism comprises solenoids 18 and 20 which are attached to T shaped blocking member 22. The solenoids shown are of the "pull" type but it will be understood that "push" type solenoids could also be employed in which case the solenoid rams 24 and 26 would not have to be affixed to T shaped blocking member 22. With the pull solenoids as shown, actuation of solenoid 18 will draw the T shaped blocking member away from gate 28 thus permitting actuator rod 14 to advance into the gate when operated by the keyed ignition lock in known manner. When the actuator bar is in the "lock" position, actuation of solenoid 20 will draw T shaped blocking member 22 across gate 28 thus preventing advance of the actuator bar 14 into the gate 28 even if a proper key is used in the steering column lock. With the embodiment as shown, actuation of T shaped member 22 across gate 28 will not in any way affect movement of the steering column lock and the ignition switch into the "accessory" position. If it is desired to also prevent movement of the actuator bar into the "accessory" position, this can be accomplished by notching actuator bar 14 as shown in FIG. 3. T shaped member 22 can then be made to engage the notch 30 of the actuator bar 14 to prevent movement of the actuator bar in either direction.

It will be understood that by selectively positioning the notch, the auxiliary locking apparatus of the present invention could be used to prevent movement of the actuating member 15 of the actuator bar 14 into one or two positions rather than into the "off," "on," and "start" positions. It would also be possible to employ more than one notch 30 in the actuator bar 14 to lock the actuator bar in a certain position in the ignition switch if desired.

The means for energizing the solenoids 18 and 20 is not a critical part of the present invention. For example, it would be suitable to have hidden buttons or switches 40 for independently operating each of the solenoids. It would also be feasible to actuate unlocking solenoid 18 by a sequence of steps which actuated the solenoid such as stepping on the brake, releasing the emergency brake, turning on the head lights, moving the switch to "accessory" position, etc. One advantage of a sequential step actuating system is that the sequence can be varied in different vehicles and a time delay switch can be inserted into the circuit so that if they are operated in the wrong sequence the sequence cannot be retried for a period of time. In the preferred form of the invention, the control circuit disclosed in U.S. Pat. No. 3,723,967 is employed whereby locking solenoid 20 is automatically activated when the vehicle door is closed and the unlocking solenoid 18 is activated when the vehicle door is unlocked by means of the induction "key."

In the preferred form of the present invention and as shown in FIG. 1, means are provided for signalling the operator of the motor vehicle if the auxiliary locking mechanism of the present invention has not been activated when the ignition switch is turned off. A cam 32 is mounted on actuator rod 14 and activates micro switch 34 by means of wheel and lever 36 when the activating mechanism 15 is in the "off" position. The micro switch can then be used to operate a buzzer of the like preferably in conjunction with the opening of the vehicle door.

It will be appreciated by those skilled in the art that the cutting of any wires in the motor vehicle electrical system in order to try to "jump" the vehicle will only further disable the vehicle when the auxiliary locking mechanism of the present invention is employed. In order to prevent actuation of the solenoid by auxiliary means such as a battery or the like, it is preferable to conceal the wires 38 attached to the solenoids 18 and 20 in an inaccessible position.

One of the advantages of the present invention over other solenoid operated auxiliary locking mechanisms is that the solenoids of the instant invention are not spring loaded and hence the usual problems of sticking and the like associated with spring operated solenoids are not encountered. A further advantage of the system of the present invention is that it operates directly on the actuator bar rather than necessitating the need for some auxiliary equipment for the locking mechanism. Additionally, a two solenoid system is of advantage since a positive lock or unlock is provided at all times without the necessity for continuously feeding current to a single solenoid as would otherwise be necessary.

It will be understood that the claims are intended to cover all changes and modifications of the preferred embodiments of the invention, herein chosen for the purpose of illustration, which do not constitute departure from the spirit and scope of the invention.

What is claimed is:

1. In a motor vehicle electrical system including an ignition switch having a plurality of positions selectively operable by an actuating mechanism on a longitudinally movable actuator bar, the improvement comprising:
   a. at least two solenoids having rams with a common longitudinal axis;
   b. a T-shaped locking member having two opposed legs and a third leg normal thereto;
   c. one said solenoid being attached to one said opposed leg and being operative to move said T-shaped blocking member to a first position wherein the said third leg prevents longitudinal movement of said actuator bar to at least one of the positions of said ignition switch;
   d. a second said solenoid being attached to the other of said opposed legs and being operative to move said T-shaped blocking member to a second position wherein the actuator bar is unobstructed of longitudinal movement by said third leg; and
   e. means for operating each said solenoid independently of the other.

2. The ignition switch of claim 1 wherein said ignition switch has "accessory," "lock," "off," "on," and "start" positions in that order and wherein the locking member when in its first position prevents movement of the actuating mechanism of the actuator bar into the "off," "on," and "start" positions.

3. The ignition switch of claim 2 wherein the locking member in the first position prevents movement of the actuating mechanism of the actuator bar from the "lock" position.

4. The ignition switch of claim 2 further comprising signalling switch means operative when the actuating mechanism of the actuator bar is in the "off" position.

5. The ignition switch of claim 1 wherein the actuator bar moves through a gate when it is unobstructed and wherein the said third leg is operative to block said gate and prevent longitudinal movement of said actuator bar through said gate when said one said solenoid is activated.

* * * * *